(12) United States Patent
Zontov

(10) Patent No.: US 8,349,051 B2
(45) Date of Patent: Jan. 8, 2013

(54) ION EXCHANGE RESIN AND A PROCESS FOR THE USE THEREOF

(75) Inventor: Nikolai Zontov, Keysborough (AU)

(73) Assignee: Clean TeQ Pty Ltd, Dadenong, Victoria (AU)

( * ) Notice: Subject to any disclaimer, the term of this patent is extended or adjusted under 35 U.S.C. 154(b) by 728 days.

(21) Appl. No.: 12/442,358

(22) PCT Filed: Sep. 21, 2007

(86) PCT No.: PCT/AU2007/001409
§ 371 (c)(1),
(2), (4) Date: Nov. 10, 2009

(87) PCT Pub. No.: WO2008/034198
PCT Pub. Date: Mar. 27, 2008

(65) Prior Publication Data
US 2010/0058893 A1      Mar. 11, 2010

(30) Foreign Application Priority Data
Sep. 21, 2006   (AU) .............................. 2006905249

(51) Int. Cl.
C22B 3/26   (2006.01)
C22B 3/36   (2006.01)

(52) U.S. Cl. ......................... 75/723; 210/660; 210/681

(58) Field of Classification Search .................... 75/723; 210/681, 660
See application file for complete search history.

(56) References Cited

U.S. PATENT DOCUMENTS
3,331,773 A  *  7/1967  Gunderson et al. ........... 210/698
4,220,726 A     9/1980  Warshawsky FOREIGN PATENT DOCUMENTS
GB          1 222 929      2/1971
WO       WO 93/12882      7/1993
WO      WO 2004/098775   11/2004

OTHER PUBLICATIONS

Dragan et al. "Organic ion exchangers as beads. Synthesis, characterization and applications." *Polymers for Advanced Technologies*. vol. 17. 2006. pp. 571-578.

* cited by examiner

Primary Examiner — George Wyszomierski
Assistant Examiner — Tima M McGuthry Banks
(74) Attorney, Agent, or Firm — Merchant & Gould P.C.

(57) ABSTRACT

A process for hydro-extracting non-ferrous metals from a slurry, pulp or solution, the process including a resin which is a copolymer of a polystyrene and a non-styrenic polymer, wherein the non-styrenic polymer includes the following sub-unit: Formula (I) wherein $R_b$ is a divalent linking group, preferably alkylene, and most preferably ($-CH_2-CH_2-$); and $R_d$ is NH, NR, O or absent. Preferably the resin has an acrylic backbone.

44 Claims, No Drawings

ION EXCHANGE RESIN AND A PROCESS FOR THE USE THEREOF

This application is a National Stage Application of PCT/AU2007/001409, filed 21 Sep. 2007, which claims benefit of Serial No. 2006905249, filed 21 Sep. 2006 in Australia and which applications are incorporated herein by reference. To the extent appropriate, a claim of priority is made to each of the above disclosed applications.

FIELD OF THE INVENTION

The present invention relates to an ion-exchange resin and a hydrometallurgical process utilising the exchange resin. The resin and process of the present invention is suitable for, but by no means limited to, extracting non-ferrous metals from raw materials including ores, concentrates, semiproducts, solutions, pulps and slurries.

The exchange resin of the present invention is an improvement over the resin described in our earlier International application PCT/AU2004/000605 (WO2004/098775).

BACKGROUND TO THE PRESENT INVENTION

Conventional hydrometallurgical processes that utilise ion-exchange resins to extract non-ferrous metals from ore typically involve the non-ferrous metals being leached from the ore with a mineral acid solution to form a slurry. The slurry is then fed to a solid/liquid separator from which a solid phase and a clear pregnant liquid phase are discharged. The liquid phase is subsequently contacted with the ion-exchange resin in a metal recovery step. However, the solid/liquid separation step has proven to be problematic for a number of reasons that stem from the solid phase having a very fine particle size distribution.

Counter/current decantation (CCD) circuits are widely used for carrying out the solid/liquid separation step. Each circuit often includes a series of 6 to 9 thickeners, each in excess of 50 metres in diameter in order to minimise metal losses and produce a clear pregnant leach liquid phase. In addition, operational costs of the thickeners include power consumption for operating raking mechanisms, and water and flocculant consumption. The flocculant consumption often ranges from 200 to over 800 grams per tonne of solid extracted and may account for up to 10% of the total plant operating costs.

To avoid the intrinsic problems of CCD circuits, resin-in-pulp processes are being developed whereby valuable metals are first leached from the raw material to form a pregnant slurry and an ion-exchange resin is then used to directly absorb the valuable metals from the slurry rather than from the clear pregnant leach solution. Loaded resin can then be separated from the pulp and the valuable metals desorbed from resin to enable reuse of the resin.

In order for the exchange resin to be viably used in resin-in-pulp processes on the commercial basis, the resin must both preferentially absorb the valuable metals and have adequate hydro-mechanical strength and durability so that it can be repeatedly used in pulp processing equipment.

SUMMARY OF THE INVENTION

According to the present invention there is provided a resin which is a copolymer of a polystyrene and a non-styrenic polymer, wherein the non-styrenic polymer includes the following acetate containing subunit:

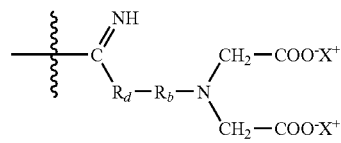

wherein $R_b$, is a divalent linking group, preferably alkylene, and most preferably —$CH_2$—$CH_2$—; and $R_d$ is NH, NR, O or absent.

According to the present invention there is provided a resin which is a copolymer of a polystyrene and a non-styrenic polymer, wherein the non-styrenic polymer includes an acetate co-ordination group, and is derived from acrylonitrile or polyacrylonitrile.

According to the present invention there is also provided a resin which is a copolymer of a polystyrene and a non-styrenic polymer, wherein the non-styrenic polymer includes a unit N having the following structure:

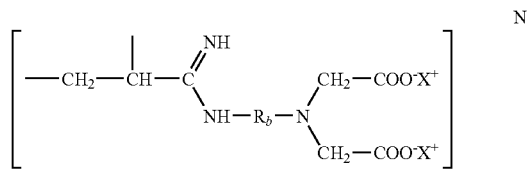

wherein $R_b$ is a divalent linking group, preferably alkylene, and most preferably —$CH_2$—$CH_2$—.

The acetate group is capable of co-ordinating to non-ferrous metals. The resin is suitably an ion exchange resin. Such resins are suitable for hydro-extracting non-ferrous metal from a metal-containing source, or raw material. They are particularly suited to the extraction of nickel from a nickel-containing source.

DETAILED DESCRIPTION

Cross-Linking

The copolymer is preferably a cross-linked copolymer. Thus, the copolymer preferably comprises a crosslinking group. The crosslinking group may be of any type generally known in the art. The most appropriate cross-linking group is that derived from divinyl benzene. The crosslinking group is preferably present at a low level, such as below 5%, and is preferably present at a level of 3-4% by weight. References to amounts by weight mean weight amounts of the monomer components, in this case the divinyl benzene, present in the polymerisation reaction as a percentage of the other components that are reacted to form a part of the polymer.

Non-Styrenic Polymer

Preferably, the non-styrenic polymer comprises a pair of acetate groups per polymer subunit of the non-styrenic polymer component, and the acetate groups are separated by between 1 and 10 atoms. The acetate pairs suitably form a bidentate co-ordination site for a non-ferrous metal ion. More preferably the acetate groups are separated by between 1 and 4 atoms, most preferably 1. In the case of a single atom separation, this may suitably be nitrogen (—N<). According to this preferred embodiment, the separation of the acetate groups is extremely suitable for forming a bidentate co-ordination site for a non-ferrous metal ion, such as nickel.

The acetate group or groups are also suitably separated from the non-styrene polymer backbone by between 1 and 10 atoms, preferably by between 3 and 6 atoms, suitably about 5. The atoms may be of any identity such as C, N, O and so forth. "Non-styrenic polymer backbone" refers to the part of the polymer forming the backbone of the polymer—which in the case of the examples shown is the carbon atom of the vinyl group of the monomer.

The acetate may be any type of acetate, containing any cation that balances the charge of the carboxy group of the acetate. Suitable cations are cations that are displaced by the target non-ferrous metal ion, such as nickel. The cation may be represented by $X^{30}$. Suitable cations is $H^+$ and $Na^+$, but any other organic or inorganic cation may be used. The acetate component may thus be represented as $—CH_2COO^-X^+$.

The non-styrenic polymer component of the copolymer is suitably based on a vinyl polymer. The term "based on" is used broadly to encompass the situation where the non-styrenic polymer could be formed in one or more stages. For example, a precursor copolymer comprising a styrenic polymer and a non-styrenic precursor polymer (the precursor not containing the acetate group or groups) could be reacted with a functionalising molecule, through which reaction the acetate group or groups (functionalising group(s)) is/are introduced into the non-styrenic portion of the precursor copolymer.

According to one embodiment, the acetate group(s) are suitably introduced by reaction of a precursor copolymer of the styrenic polymer and a non-styrenic precursor polymer (which is different to the non-styrenic polymer of the target copolymer) with a functionalising molecule comprising the acetate group or groups. This may be completed in a single stage, or in multiple stages, as described further below.

The precursor non-styrenic polymer of the precursor copolymer, that is, the precursor non-styrenic vinyl polymer, may suitably be based on an acrylate structure, such as acrylonitrile and/or an acrylate. The acrylate may be acrylate itself, methacrylate, or a C2-C4-acrylate. A suitable acrylate is methacrylate. The vinyl monomer may thus be represented as $CH_2=CR_1—R_2$, wherein $R_1$ represents hydrogen or an alkyl group from $C_1$ to $C_4$, and $R_2$ represents any suitable functional group known for vinyl polymers in the art, such as nitrile, C1-C4 ester or a salt thereof.

In one specific embodiment involving the use of acrylonitrile, the majority of the polymer backbone for the copolymer is based on acrylonitrile—at least 75% by weight. The polymer component of the copolymer that is derived from acrylonitrile (through functionalisation) constitutes at least 75%, preferably at least 84% of the copolymer. The acrylate may also be used to form part of the polymer backbone, and is generally introduced to control the rate and extent of polymerisation. It may be excluded, but when present the copolymer component derived from the acrylate generally constitutes 0.5-5% of the copolymer.

Two-Stage Process for Introducing Acetate Group(s)

In the case of a two-stage process for introducing the acetate group or groups, this may involve
(i) reacting the precursor non-styrenic polymer component of the precursor copolymer with a linking group to form an intermediate copolymer, and then
(ii) reacting the intermediate copolymer bearing the linking group with a functionalising group comprising the acetate group(s).

In this embodiment, a suitable linking group is an alkylene diamine such as ethylene diamine, and thereafter reaction with a functionalising group will introduce the acetate group (s) into the copolymer.

According to one example, the copolymer comprises either one or a combination of:

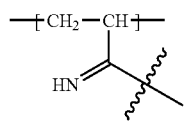

linked to iminodiacetic acid (or a salt thereof) by any divalent linking group such as $—NH—CH_2—CH_2—$ through the open bond represented by the wavy line; and

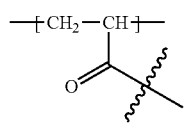

linked to iminodiacetic acid (or a salt thereof) by any divalent linking group such as $—NH—CH_2—CH_2—$ through the open bond represented by the wavy line.

Iminodiacetic acid refers to the group $—N(—CH_2—CO_2H)_2$.

In addition, the term "divalent linking group" refer to the linking group that has two available covalent bonds to link the illustrated group with the iminodiacetic acid.

Heterocyclic-Group

During this process for the preparation of the copolymer in stages, via polyacrylonitrile, which is reacted with an alkylenediamine, the intermediate with the alkylene amine arm may be condensed to form a heterocyclic ring (a nitrogen-containing heterocyclic ring). In the case of ethylene diamine, this results in the copolymer comprising an additional polymer component—an imidazole-bearing component.

The heterocyclic-group containing polymer component may constitute 15-40%, but preferably 23-28%, of the copolymer by weight.

Styrenic Polymer Component

The polystyrenic component is suitably a substituted polystyrene. There may be one or more substituents on the benzene ring of the substituted polystyrene. Preferably there is a single substituent. One suitable substituent is an alkyl, and ethyl in particular.

It is preferred that the styrene groups be selected from one or a mixture of: σ-Ethylstyrene; vinylstyrene and σ-divinylbenzene (DVB).

The polystyrenic component of the copolymer (excluding any styrenic cross-linker) preferably constitutes between 2 and 2.5% of the copolymer by weight.

The polystyrenic component and the divinyl benzene provide physical structure to the acrylic backbone.

Additional Components

The copolymer may comprise further polymer components (that is, components that are covalently linked to form part of the polymer). If other polymer components are present, these preferably constitute less than 5% by weight of the polymer.

Structural Formulae

It is preferred that the resin comprises a copolymer having the following units:

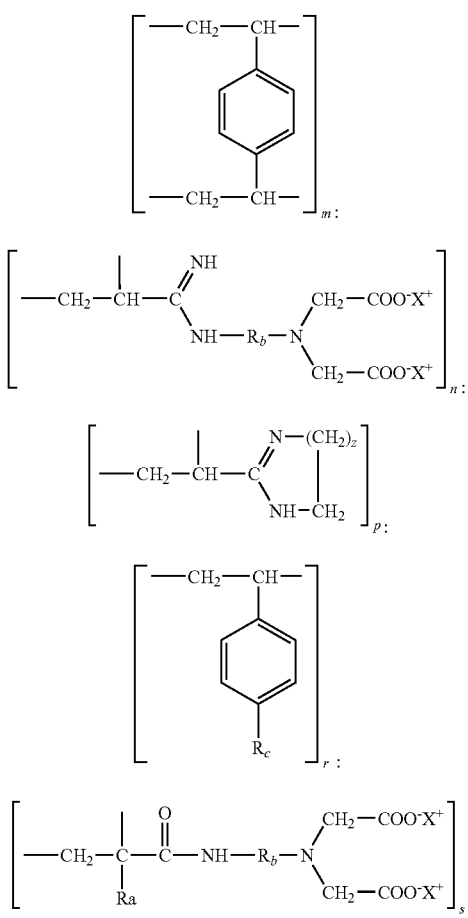

wherein
$R_a$ is H or a C1-C4 alkyl;
$R_b$ is a divalent linking group, preferably alkylene, and most preferably —$CH_2$—$CH_2$—;
$R_c$ is alkyl, preferably —$CH_2$—$CH_3$;
z is 1, 2 or 3.

Preferably, the ratio of m:n:p:r:s on a weight basis varies within the following ranges of m:n:p:r:s:
m ranges from 3 to 4;
n ranges from 61 to 67;
p ranges from 23 to 28;
r ranges from 2 to 2.5; and
s ranges from 0.5 to 5.

Suitably, the ratio of m:n:p:r:s on a weight basis occurs in the following ratios:
m is approximately 3.5
n is approximately 64
p is approximately 27
r is approximately 2.5; and
s is approximately 3.

In the situation where acrylate is excluded from the polymer backbone, the S constituent is absent and it is preferred that the ratio of m:n:p:r on a weight basis varies within the following ranges of m:n:p:r
m ranges from 3 to 4;
n ranges from 61 to 69;
p ranges from 23 to 29; and
r ranges from 2 to 3.5.

Suitably, the ratio of m:n:p:r on a weight basis occurs in the following ratios:
m is approximately 3.5
n is approximately 68.0
p is approximately 26.0
r is approximately 2.5.

It will be understood that it is not implied in the formula above that the units are present in isolated blocks in the copolymer, but are present randomly.

It is preferred that the resin has a particle size distribution in which 99% of the resin is less than 2000 micron in diameter. The resin may be 99% in the range of 600 to 2000 microns.

It is preferred that the resin has a particle size distribution in which 50% of the resin has a diameter ranging from 1000 to 2000 micron.

In the situation where the resin contains the S constituent, an example of the particle size distribution of the resin is as follows:

TABLE A

| Particle Size Range (diameter) | % within Range |
| --- | --- |
| >425 < 630 micron | 0.3 |
| >630 < 850 micron | 8.5 |
| >850 < 1180 micron | 26 |
| >1180 < 1700 micron | 53 |
| >1700 < 2000 micron | 11 |
| >2000 micron | 1.2 |

It is preferred that the resin has a mechanical stability factor of 95% for particle sizes greater than 600 micron when tested according to a ball milling test procedure. The procedure for the ball milling test has been discussed in detail in the Example section of this specification.

Manufacturing Process

According to the present invention there is also provided a process for the manufacture of a resin including the steps of:
  a) forming a precursor copolymer by polymerising a polystyrene and a non-styrenic polymer; and
  b) functionalising the precursor copolymer by the introduction of one or more than one acetate groups onto a portion of the non-styrenic portion of the precursor copolymer.

Preferably, the non-styrenic polymer in step a) is a vinyl polymer, suitable acrylonitrile or polyacrylonitrile. Use of acrylonitrile or polyacrylonitrile provides the non-styrenic portion of the precursor co-polymer formed by step a) with active/reactive cyano groups.

Preferably, the polystyrene in step a) is substituted polystyrene having one or more substituents, suitably an alkyl, on the benzene ring of the substituted polystyrene. Suitably, the polystyrene is derived from divinylbenzene.

According to one embodiment, the rate of growth of the precursor copolymer is, at least in part, managed or controlled by the addition of another non-styrenic polymer to step a) preferably an acrylate, and suitably methacrylate. The methacrylate may be an alkyl methacrylate and/or an acid thereof. Use of methacrylate will provide the non-styrenic portion of the precursor co-polymer with reactive hydroxyl groups.

Preferably step a) is carried out at a temperature range from 20° C. to 200° C., and more preferably at a temperature ranging from 45° C. to 70° C.

Preferably step a) is carried out in the presence of a catalyst in the form of benzoyl peroxide.

Although the introduction of acetate group(s) according to step b) may be carried out as a single stage, preferably step b) involves two sub-stages, suitably carried out one after the other.

Preferably, a first sub-stage of step b) involves reacting the precursor non-styrenic polymer component of the precursor copolymer formed by step a) with a linking group in the form of an alkylene diamine, such as ethylene diamine, so as to form an intermediate copolymer having arm extension(s). The term "arm extension" refers to free ends or ends of reacted alkylene diamine extending from the intermediate copolymer.

In the situation where step a) involves the polymerisation of a non-styrenic polymer in the form of acrylonitrile preferably, the first sub-stage of step b) involves directly reacting cyano groups of the acrylonitrile-derived component with alkylene diamine to form arm extension(s) from alkylene diamine extending from the acrylonitrile derived component of the copolymer.

In the situation where the non-styrenic polymer in step a) includes methacrylate, preferably the first sub-stage of step b) involves directly reacting hydroxyl groups of the methacrylate derived component with alkylene diamine to form arm extension(s) from alkylene diamine extending from the polyacrylate or methacrylate derived component of the copolymer.

Preferably the second sub-stage of step b) involves reacting the arm extensions of the intermediate copolymer to produce iminodiacetic groups on the non-styrenic components. Even more preferably, the second sub-stage involves reacting the intermediate copolymer with acetic acid, suitably chloroacetic acid, in the presence of a hydroxide. Preferably, the intermediate copolymer is rinsed or washed of amine before reaction with acetic acid.

Preferably, the first sub-stage of step b) may also involves a condensation reaction of the arm extensions of the acrylonitrile-derived component to form a heterocylic-group on the acrylonitrile component. The condensation reaction may occur contemporaneously with the direction reaction of alkylene diamine with active cyano groups of the acrylonitrile derive component of the copolymer and/or hydroxyl groups of the polyacrylate derive component of the copolymer.

Preferably, the first sub-stage of step b) is carried out at a temperature ranging from 100° C. to 300° C.

Preferably, the second sub-stage of step b) involving reacting the intermediate copolymer with acetic acid, suitably chloroacetic acid is a carried out at a temperature in the range of 80 to 95° C.

Applications

According to the present invention there is also provided a process for hydro-extracting non-ferrous metals from a slurry, pulp or solution with a liquid phase containing valuable metals, the process including the step of adsorbing non-ferrous metals from the liquid phase onto an exchange resin, wherein the exchange resin is as described above.

Although the non-ferrous metals may for example be lead or copper, it is preferred that the non-ferrous metal be nickel and/or cobalt, or minerals containing these metals.

This process is useful for the separation of target metals, such as nickel and/or cobalt from impurities.

It is preferred that the step of adsorbing the non-ferrous metal onto the resin be carried out at a temperature at or below 100° C.

It is preferred that the process include adjusting the pH of the liquid phase by adding an alkaline agent to the liquid phase prior to or during the adsorption step.

It is preferred that the pH of the liquid phase be in the range of 1.0 and 5.0.

It is even more preferred that the pH of the liquid phase be in the range of 3.5-4.5.

By way of non-limiting examples, the alkaline agent may be limestone, lime, alkali hydroxides, alkali carbonates, alkali bicarbonates, alkaline earth oxides, alkaline earth hydroxides, alkaline earth carbonates, alkaline earth bicarbonates or mixtures thereof.

Once the resin is loaded with non-ferrous metals, it is preferred that the process include a step of separating the resin from the slurry or pulp.

The separating step may be carried out using screen separators.

It is preferred that the process includes a step of stripping the resin of adsorbed non-ferrous metals using an acidic or ammoniacal solution.

In the situation when the stripping agent is an acid, it is preferred that the acid be either sulphuric acid, hydrochloric acid or nitric acid.

When the stripping agent is an acid, it is preferred that the concentration of the acid be in the range of 0.5M-5.0M.

In the situation when the stripping agent is an ammoniacal solution, it is preferred that the solution range from 15 to 25% ammonia.

Once the resin has been stripped of non-ferrous metals, it is preferred that the resin be recycled back to the absorption step.

It is preferred that the process includes a step of leaching an ore or concentrate or other raw material with a mineral acid or ammoniacal solution to dissolve the non-ferrous metals such that the liquid phase of the slurry or pulp is pregnant with valuable material. The leaching step may be carried out using any known technique including high pressure leaching, agitation leaching, heap leaching, atmospheric leaching, bio-oxidation leaching or a combination of these techniques.

It is preferred that the slurry or pulp include from 10 to 60% solid material.

It is even more preferred that the slurry of pulp include from 30 to 60% solid material.

EXAMPLES

The following examples relate to two embodiments of resins in accordance with the present invention, with one resin (hereinafter referred to as the "first resin") including the above mentioned S constituent and the other resin (hereinafter referred to as the "second resin") not including this constituent. The description of the resin is now provided under the follow headings:

"Resin preparation" which describes a procedure for the synthesis of the first and second resins;

"Ball Milling Test" which describes a laboratory procedure to test the mechanical stability of the first resin; and "Absorption Test" which describes the details of two absorption trials demonstrating the suitability of the first resin for absorbing non-ferrous metals from a tailings solution and a leach slurry.

Resin Preparation

The first resin has the structure set out above under the heading "Structural Formulae", having constituent components M, N, P, R and S, in which $R_a$ methyl, $R_b$ is —$CH_2$—$CH_2$— at each instance, $R_c$ is ethyl, z is 1, and wherein the ratio of m:n:p:r:s on a weight basis occurs in the following ratios:

m is approximately 3.5
n is approximately 64
p is approximately 27
r is approximately 2.5; and
s is approximately 3.

As can be seen, constituents N and P which are derived from polyacrylonitrile are present to a much greater extent than the other constituents M, R and S. Constituent S is based on another non-styrenic vinyl polymer (methacrylate) but is present to a much lesser extent than constituents N and P. The vinyl groups form the backbone of the resin, with the resin containing little polystyrene.

The relative amounts of constituents M, N, P, R and S in the resin produced can be determined by experiment having regard to the precise composition of the starting materials.

Synthesis of the first resin comprises an initial polymeric reaction to form a precursor copolymer material. The initial polymeric reaction involves the polymerisation of acrylonitrile together with crosslinking co-monomers ρ-divinylbenzene (DVB) and ethylenestyrene (ES), represented by constituents M and R respectively. The monomeric reactants, namely acrylonitrile, DVB and ES are charged into a vessel containing an aqueous medium containing a suitable dispersing agent and a polymerisation catalyst, such as benzoyl peroxide. The reaction mixture is vigorously agitated and is maintained at a temperature ranging from 20° C. to 200° C., and preferably from 45° C. to 70° C., as polymerisation takes place.

Polymerisation of the reactants produces a precursor copolymer resin in a bead or generally circular formation. Methacrylate is also added to the reaction mixture to control the rate of growth of the beads and ultimately the size of the beads formed. The precursor (reactive) copolymer contains reactive cyano groups provided by the acrylonitrile and hydroxyl groups provided by methacrylic acid. However, the intermediate polymeric material is sufficiently stable to be able to be stored for an extended period if needed.

Derivatisation of the precursor copolymer to form the final resin product is achieved by a two stage process. The first stage involves the following three types of reactions:

i) Direct reaction of the active cyano groups of the acrylonitrile-derived component with ethylene diamine so as form an "arm" extending from the acrylonitrile-derived group.

ii) Direct reaction with the reactive hydroxyl group in the methacrylate-derived component with ethylene diamine so as form an "arm" from the polyacrylate-derived component of the copolymer.

iii) Condensation of a portion of the "arm" extensions of the product produced by reaction (i) above, so as form the imidazole group present in constituent P.

Reactions i) to iii) are carried out contemporaneously under anhydrous conditions and at a temperature ranging from 100° C. to 300° C. in the presence of a suitable catalyst.

The second stage of derivatisation involves reacting the non-condensed "arm" extensions of the intermediate copolymer thus produced with additional acetic functionality so to form the iminodiacetic groups of the non-styrenic components of the polymer represented by N and S in the formula above. Specifically, the copolymer is rinsed free of excess amine and then reacted with chloroacetic acid at a temperature ranging from 80 to 95° C. in the presence of sodium or potassium hydroxide to introduce the acetate groups and produce di-iminoacetetate functional groups.

The resin is manufactured as discrete polymeric particles and when in the hydrated form may have the following size distribution.

TABLE B

| Particle Size Range (diameter) | % within Range |
| --- | --- |
| >425 < 630 micron | 0.3 |
| >630 < 850 micron | 8.5 |
| >850 < 1180 micron | 26 |
| >1180 < 1700 micron | 53 |
| >1700 < 2000 micron | 11 |
| >2000 micron | 1.2 |

The second resin has the structure set out above under the heading "Structural Formulae", having the constituent components M, N, P, and R, i.e. constituent S is not present, and in which $R_b$, is —$CH_2$—$CH_2$— at each instance, $R_c$ is ethyl, z is 1, and wherein the ratio of m:n:p:r on a weight basis occurs in the following ratio:

m is approximately 3.5
n is approximately 68.0
p is approximately 26.0
r is approximately 2.5.

Synthesis of the second resin is substantially the same as the synthesis procedure outlined above for the first resin, save for the exclusion of the methacrylate from the synthesis procedure. It therefore follows that the first stage of derivatisation of the precursor copolymer material to form the final resin product involves reactions i) and iii) but not reaction ii). We have found that synthesis of the second resin as described above provides a size distribution in which in excess of 5% of the resin has a size in the range from 425 to 630 micron. In contrast, synthesis of the first resin as described above provides a size distribution that is less than 1% of the resin over the same size range. Generally speaking, the first resin is therefore more suited to moving bed processes than the second resin.

Ball Milling Test

The commercial viability of the resin is at least in part dependent on the ability of the resin to withstand mechanical loads. Hydro-mechanical strength or mechanical stability are terms used to describe the durability of a resin and is an indication of the suitability of a resin for use in abrasive liquid environments and in pulp processing equipment.

The hydro-mechanical strength of an ion-exchange resin may be assessed according to the following ball milling test. This test holds for any ion exchange process, including resin-in-pulp processes.

The test was carried out using a ball mill apparatus consisting of a stainless steel metal barrel with an internal height of 98 mm+/−0.5 mm and an inside diameter of 80 mm+/−0.5 mm. One end of the barrel had an opening with a screw cap for loaded material into the barrel and the other end has a 10 mm shaft that was attached to a rotating drive. During operation the barrel was supported in the horizontal orientation and rotated about its longitudinal axis.

Metal balls of two sizes were then loaded into the barrel. Specifically, between 22 and 24 balls having a diameter of 12 mm±0.5 mm were loaded into the barrel and between 33 and 36 balls having a diameter of 7.5 mm±0.5 mm were also loaded into the barrel.

A resin having the structure and size distribution of the first resin of the present invention as described above was prepared in accordance with the procedure described under the heading "Resin Preparation". The resin was then was then sieved using a 600 micron sieve and a 100 ml sample of hydrated resin with particles larger than 600 ml was collected and loaded into the barrel together with the balls and 100 ml of water.

The barrel was then operated for 60 minutes at 200 rpm. After 60 minutes the resin is emptied from the cylinder and sieved through a 212 micron sieve. The resin was again sieved by the 600 micron sieve and the resin not passing through the sieve was placed into a measuring cylinder and its volume recorded.

The volume of resin measured in the cylinder is assumed to be unbroken and a mechanical stability factor is then calculated as a percentage of the resin unbroken.

The resin was found to have a mechanical stability factor of at least 95%. In our experience resins having a mechanical strength of 95% can be employed in direct resin in pulps applications where the pulps comprise up to 60% solid phase. In addition, the resin can be used in sorption equipment having any suitable configuration and can be used in any type of process including batch, continuous, co-current or counter-current processes.

By way of comparison, we carried out the same ball milling test as outline above on two commercially available resins, namely resins available under the trade names DOW XFA 4195 and ROHM & HAAS IRC-718. As can be seen from the results shown in the table below, we found that the mechanical strength of the first resin of the present invention is far superior than the strength of the commercially available resins tested.

| Resin Type | Retained on 0.6 mm sieve before milling | Retained on 0.6 mm screen after milling |
| --- | --- | --- |
| Commercial Resin DOW XFA 4195 | 100 | 82 |
| Commercial Resin ROHM & HAAS IRC-718 | 100 | 61 |
| First Resin of present invention | 100 | 99.3 |

Absorption Tests

Example 1

This example involved the extraction of nickel and cobalt from a test solution in the form of a tailing solution of a nickel/cobalt production plant.

The example was performed in a 700 ml-glass fixed-bed column containing beads of resin having a structure in accordance with the first resin of the present invention described above and which was made in accordance with the synthesis procedure described above under the heading "Resin Preparation". The test solution was pumped into the top of the column such that it cascaded downwardly over the resin to collect at the bottom of the column. A peristaltic pump was used to pump the solution at the desired rate to the top of the column and the barren solution was discharged from the bottom of the column. The test solution was pumped to the top of the column at 3-5 vol/vol/hr, or 2.1-3.5 L/hr for 40 hours and had a pH of about 5.5. Nickel concentrations in barren liquor discharged from the bottom of the column were monitored every 60 minutes until the nickel concentration exceeded a predetermined value of 200 ppm. Once the pre-selected value had been reached, the sorption extraction stage was complete.

After the sorption stage, an analysis of the resin showed that three-quarters of the resin (i.e. 510 ml from the total 700 ml) was fully saturated.

The fully loaded portion of the resin was then rinsed with water and further processed in a desorption stage in the same column by running a solution of 8% sulphuric acid through the column at rate of 0.5 vol/vol/hr or 250 ml/hr. The desorption stage was carried out for a period of 6 hours, consumed 1.5 L of acid and produced an eluate solution that was drained from the base of the column.

Set out below in table 1 are the compositions of the test solution, barren solution and eluate solution.

TABLE 1

| Metal elements in ppm unless otherwise stated | | | |
| --- | --- | --- | --- |
| Metal Element | Test solution | Barren solution | Eluate solution |
| Al | 0.02 | <0.01 | 0.80 |
| Co | 15.2 | 0.2 | 523 |
| Cr | 0.23 | 0.11 | 1.20 |
| Cu | 0.09 | 0.01 | 1.40 |
| Fe | <0.01 | <0.01 | 0.69 |
| Mg g/l | 24.2 | 22.7 | 2.75 |
| Mn | 806 | 328 | 1234 |
| Ni | 286 | 4.72 | 17,950 |
| Si | 16.5 | 12.9 | 7.25 |
| Zn | <0.01 | <0.01 | 9.81 |

The compositions shown in table 1 indicate that 98.3% of the incoming nickel and 98.7% of cobalt were removed from the test solution. The nickel concentration in the eluate was very high and reached 18 g/L of nickel and more than 0.5 g/L of cobalt.

The ratio of the target metal concentration of the target metal, nickel, to the potential impurities in the desorption solution was much greater than the ratios in the applied solution providing a high single step purification factor.

Example 2

This example involved the extraction of nickel and cobalt from a high-pressure laterite leach slurry.

The leach slurry was prepared in a titanium autoclave at a temperature ranging from 220 to 230° C. with sulphuric acid. The pregnant leach slurry had a pH of about 0.8, a specific gravity of about 1.40 and a solids concentration of about 28.5 w/w %.

The pH of pregnant leach slurry was adjusted by adding a limestone pulp several hours before the extraction stages. The slurry after neutralisation had a pH of about 4.5 and a solids concentration of about 35.0 w/w %.

The leach slurry was fed through an absorption circuit that comprised ten reactors connected in series. Each reactor was made of a borosilicate glass and housed a stainless steel mesh basket containing about 100 mL of beads of resin having a structure in accordance with the first resin of the present invention described above and which was made in accordance with the synthesis procedure described above under the heading "Resin Preparation". The slurry was conducted through the reactors, from reactor number 1 to reactor number 10 while the resin-filled baskets were transferred in counter current to the direction of the flow for the slurry from reactor number 10 to reactor number 1.

Fresh pregnant leach slurry was pumped into reactor number 1 by a peristaltic pump at a flow rate of about 0.6 L/hr which determined the speed of the slurry throughout the absorption circuit. The slurry was maintained at a temperature of approximately 60° C. and was mixed in the reactors by means of air agitation.

The basket and resin removed from reactor 1 was treated in a desorption stage which involved passing a solution of 12% hydrochloric acid through a 700 mL desorption fixed-bed column filled with loaded resin at rate 0.5 vol/vol/hr or 350 ml/hr to produce an eluate solution.

Set out below in table 2 are the compositions of the test solution, barren solution and eluate solution.

TABLE 2

Elemental concentrations in ppm unless otherwise stated (LP represents liquid phase) (SP represents solid phase)

| Elements | Feed pulp (LP) | Feed pulp (SP) | Barren pulp (LP) | Barren pulp (SP) | Eluate |
|---|---|---|---|---|---|
| Ni | 6890 | 1190 | 1.2 | 892 | 49 g/l |
| Co | 171 | 44 | <0.2 | 39 | 1304 |
| Fe | 0.6 | 19% | 0.4 | 19% | 13.7 |
| Mn | 1598 | 381 | 1379 | 376 | 1258 |
| Mg | 17100 | 0.09% | 13690 | 0.08% | 1056 |
| Cu | 0.2 | 58 | 0.1 | 40 | 99 |
| Zn | 21 | 59 | 0.1 | 47 | 72 |
| Al | 0.5 | 1% | 0.5 | 1% | 136 |
| Ca | 523 | 5.8% | 621 | 3.94% | 370 |
| Si | 49 | 19% | 42 | 19% | 17.1 |
| Cr | <0.2 | 8470 | <0.2 | 6890 | 1.29 |

The results of example 2 have the following favourable outcomes:
  virtually complete extraction of nickel and cobalt from the liquid phases of the feed slurry, i.e. extraction rates up to 99.9% were achieved;
  high resin loading for the targeted metals, i.e. up to 45 g/L for nickel;
  high concentrations of nickel and cobalt in the eluate solution, i.e. 49 g/L of nickel and 1.3 g/L of cobalt; and
  low impurity levels.

It will be appreciated by those skilled in the art of the present invention that many modifications and variations may be made to the Examples described above without departing from the spirit and scope of the present invention.

The claims defining the invention are as follows:

1. A process for hydro-extracting non-ferrous metals from a slurry, pulp or solution with a liquid phase containing valuable metals, the process including a step of adsorbing non-ferrous metals from the liquid phase onto a resin which is a copolymer of a polystyrene and a non-styrenic polymer, wherein the non-styrenic polymer includes the following acetate containing subunit:

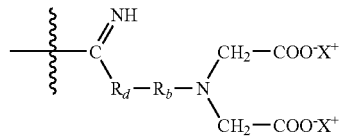

wherein $R_b$ is a divalent linking group; $R_d$ is NH, NR, O or absent.

2. The process according to claim 1, wherein the non-ferrous metals are nickel, cobalt, nickel and cobalt, or minerals containing these metals.

3. The process according to claim 1, wherein the step of adsorbing the non-ferrous metals onto the resin is carried out at a temperature at or below 100° C.

4. The process according to claim 1, including adjusting the pH of the liquid phase by adding an alkaline agent to the liquid phase prior to or during the adsorption step.

5. The process according to claim 4, wherein the pH of the liquid phase is in the range of 1.0 and 5.0.

6. The process according to claim 5, wherein the pH of the liquid phase is in the range of 3.5 to 4.5.

7. The process according to claim 4, wherein the alkaline agent is limestone, lime, alkali hydroxides, alkali carbonates, alkali bicarbonates, alkaline earth oxides, alkaline earth hydroxides, alkaline earth carbonates, alkaline earth bicarbonates or mixtures thereof.

8. The process according to claim 1, further including a step of separating the resin loaded with non-ferrous metals from the slurry or pulp.

9. The process according to claim 8, wherein the separating step is carried out using screen separators.

10. The process according to claim 1, wherein the process includes a step of stripping the resin of adsorbed non-ferrous metals using an acid stripping solution or an ammoniacal stripping solution.

11. The process according to claim 10, wherein the acid solution is sulphuric acid, hydrochloric acid or nitric acid having a concentration in the range of 0.5M to 5.0M.

12. The process according to claim 10, wherein the ammoniacal solution has a concentration ranging from 15 to 25% ammonia.

13. The process according to claim 10, wherein once the resin has been stripped of non-ferrous metals, the resin is recycled back to the absorption step.

14. The process according to claim 1, wherein the slurry or pulp includes from 10 to 60% solid material.

15. The process according to claim 1, wherein the slurry of pulp includes from 30 to 60% solid material.

16. The process of claim 1, wherein $R_b$ is an alkylene.

17. The process of claim 1, wherein the non-styrenic polymer is derived from acrylonitrile or polyacrylonitrile.

18. The process of claim 1, wherein the non-styrenic polymer derived from acrylonitrile or polyacrylonitrile constitutes at least 75% of the copolymer by weight.

19. The process of claim 1, wherein the non-styrenic polymer derived from acrylonitrile or polyacrylonitrile constitutes at least 85% of the copolymer by weight.

20. The process of claim 1, wherein $R_d$ is NH and the acetate containing subunit is included in a unit N having the following structure:

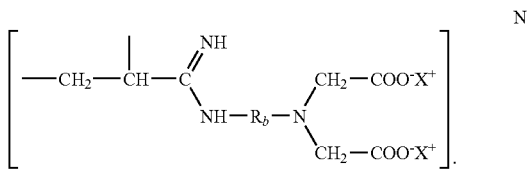

21. The process of claim 20, wherein the unit N constitutes from 61 to 69% of the copolymer by weight.

22. The process of claim 1, wherein the non-styrenic polymer component further includes a unit P having the structure:

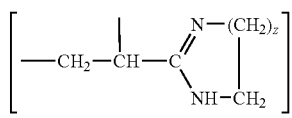

wherein Z is 1, 2 or 3.

23. The process of claim 22, wherein the unit P constitutes from 15 to 40% of the copolymer by weight.

24. The process of claim 23, wherein the unit P constitutes from 23 to 29% of the copolymer by weight.

25. The process of claim 1, wherein the non-styrenic polymer component further includes a unit S having the following structure:

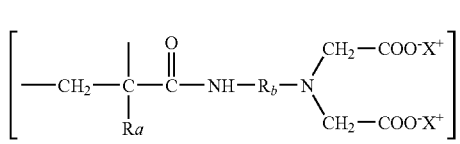

wherein $R_a$ is H or a C1-C4 alkyl; and $R_b$ is a divalent linking group.

26. The process of claim 25, wherein $R_b$ is $R_b$ is —CH$_2$—CH$_2$—.

27. The process of claim 25, wherein the unit S constitutes from 0.5 to 5% of the copolymer by weight.

28. The process of claim 1, wherein the polystyrenic component is a substituted polystyrene.

29. The process of claim 28, wherein the polystyrenic component has one or more substituents on a benzene ring of the substituted polystyrene in the form of an alkyl.

30. The process of claim 29, wherein the polystyrenic component substituted with an alkyl constitutes from 2 to 2.5% of the copolymer by weight.

31. The process of claim 1, wherein the resin is a crosslinked copolymer and the polystyrenic component further includes a styrenic cross-linker derived from divinylbenzene.

32. The process of claim 31, wherein the polystyrenic cross-linker component constitutes less than 5% of the copolymer by weight.

33. The process of claim 31, wherein the styrenic cross-linker component constitutes from 3 to 4% of the copolymer by weight.

34. A process for hydro-extracting non-ferrous metals from a slurry, pulp or solution with a liquid phase containing valuable metals, the process including a step of absorbing non-ferrous metals from the liquid phase onto a resin which is copolymer having the following structural units:

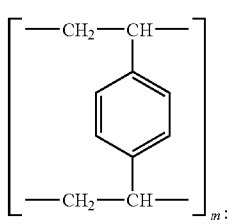

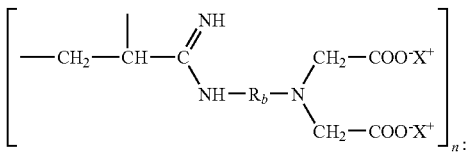

wherein
$R_b$ is a divalent linking group;
$R_c$ is alkyl;
z is 1, 2 or 3.

35. The process of claim 34, wherein $R_b$ is —CH$_2$—CH$_2$—.

36. The process of claim 34, wherein $R_c$ is —CH$_2$—CH$_3$.

37. The process of claim 34, wherein a ratio of m:n:p:r on a weight basis varies within the following ranges:
m ranges from 3 to 4;
n ranges from 61 to 69;
p ranges from 23 to 29; and
r ranges from 2 to 3.5.

38. The process of claim 34, wherein a ratio of m:n:p:r on a weight basis occurs in the following ratios:
m is approximately 3.5
n is approximately 68.0
p is approximately 26.0
r is approximately 2.5.

39. The process of claim 34, further including a unit S having the following structure

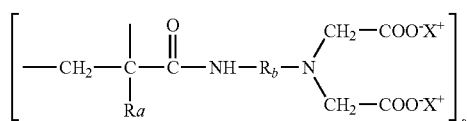

wherein $R_a$ is H or a C1 to C4 alkyl.

40. The process of claim 39, wherein a ratio of m:n:p:r:s on a weight basis varies within the following ranges:
m ranges from 3 to 4;
n ranges from 61 to 67;
p ranges from 23 to 28;
r ranges from 2 to 2.5; and
s ranges from 0.5 to 5.

41. The process of claim 39, wherein a ratio of m:n:p:r:s on a weight basis occurs in the following ratios:
m is approximately 3.5
n is approximately 64
p is approximately 27
r is approximately 2.5; and s is approximately 3.

42. The process of claim 34, wherein the resin has a particle size distribution in which 99% of the resin is less than 2000 micron in diameter.

43. The process of claim 34, wherein the resin has a particle size distribution in which 50% of the resin has a diameter ranging from 1000 to 2000 micron.

44. The process of claim 34, wherein the resin has a mechanical stability factor of 95% for particle sizes greater than 600 micron when tested according to a ball milling test procedure.

* * * * *